D. PIERCE.
CAR-MOVER.
No. 192,713.  Patented July 3, 1877.
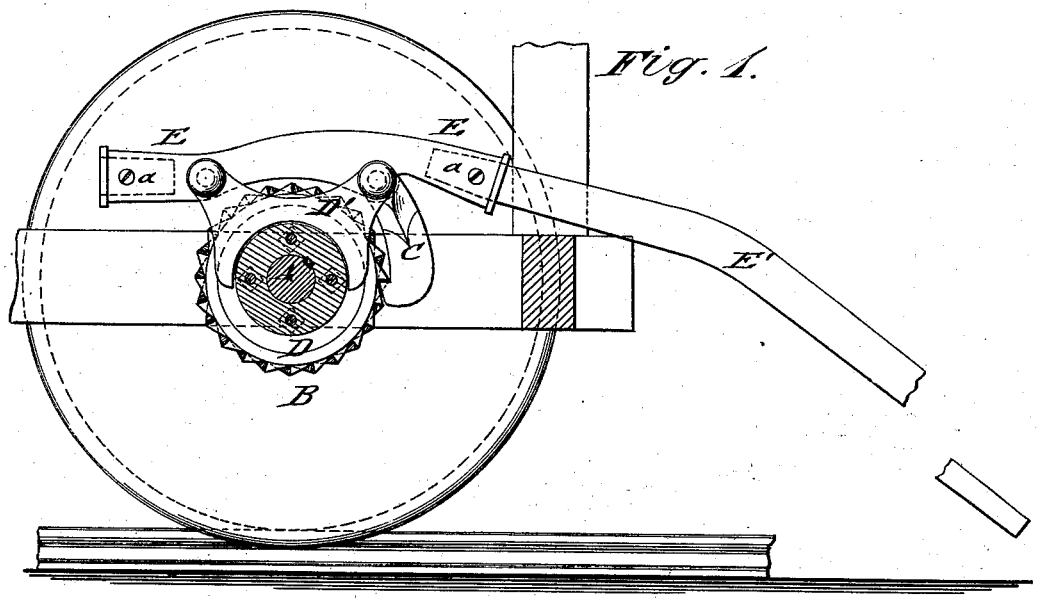
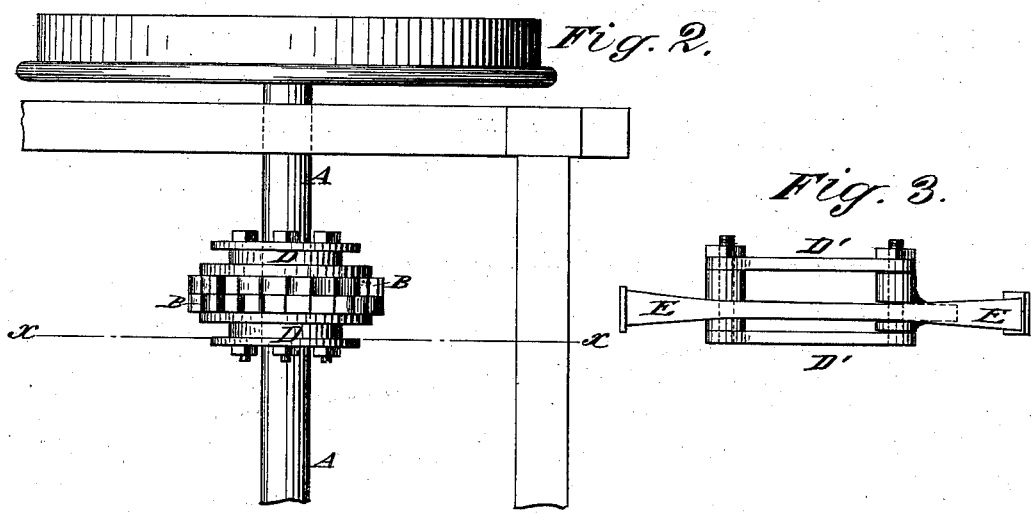
WITNESSES:  INVENTOR:

UNITED STATES PATENT OFFICE.

DANIEL PIERCE, OF BROWNINGTON, VERMONT.

IMPROVEMENT IN CAR-MOVERS.

Specification forming part of Letters Patent No. 192,713, dated July 3, 1877; application filed June 4, 1877.

*To all whom it may concern:*

Be it known that I, DANIEL PIERCE, of Brownington, in the county of Orleans and State of Vermont, have invented a new and Improved Car-Mover, of which the following is a specification:

In the accompanying drawing, Figure 1 represents a side elevation of my improved car-moving implement, partly in section on line $x\,x$, Fig. 2. Fig. 2 is a top view of the fixed cog-wheels, attached to the car-axle, and Fig. 3 a top view of the yoke-frame, carrying the lever-sockets and pawls.

Similar letters of reference indicate corresponding parts.

The invention refers to a device for moving freight and street cars on railroad-tracks, which device may be also used for hoisting and other purposes; and it consists of two cog-wheels, arranged in fixed position, but with teeth at opposite direction to each other, on the car axle or shaft, the cog-wheels having circumferentially-grooved side disks for the detachable yoke-frame carrying the lever-sockets and pawl.

In the drawing, A represents the car axle, shaft, or other body to which the cog-wheels B of my improved car-moving or weight-hoisting device are keyed. The cog-wheels B are intended to be attached to one of the axles of each car, forming a stationary fixture of the same.

The teeth of the cog-wheels are arranged to run in opposite direction to each other, for the purpose of admitting the engaging of the actuating-pawl C with either cog-wheel, for moving the car in either direction.

To both sides of the cog-wheels are bolted, or otherwise attached, grooved disks or collars D, that serve for supporting the yoke-frame D', to the lateral connecting-bolts of which a lever with sockets, E, is rigidly keyed, while the actuating-pawl C is hinged to one of them. The lever-sockets E are arranged to receive a hand-lever, E', that is secured to either socket by a clamp-screw, $a$.

The yoke-frame D' is placed on the grooved side disks D, with the pawl either at one side or the other of the cog-wheels, so as to engage one cog-wheel or the other, according to the direction in which the car is to be moved.

For forward motion, the hand-lever is placed into the socket adjoining the pawl, and yokes and pawl then placed in position on the side disks, the pawl being then at the side of the operator, as in Fig. 1.

By lifting the hand-lever the pawl engages the teeth of one cog-wheel and revolves the axle, moving thereby the car forward. Each lift on the lever gives the car a corresponding forward motion.

For moving the car back, the lever is clamped to the socket at the opposite end of the yokes, and the yokes and pawl then placed again on the grooved disks, the pawl being then at the other side of the axle, so as to engage the other cog-wheel. By pressing the lever down, the axle is turned in opposite direction, and the car moved backward with each downward motion of the hand-lever.

The car-moving device is conveniently used and admits the moving of a number of cars by one man, it being easily operated and powerful in action, as the pressure of the yokes in connection with the lifting action of the pawl exerts a considerable force on the axle.

The lever and yoke-frame exert a compound purchase on the car, so that the same can be moved quickly in forward or backward direction, and with less effort than by the common devices heretofore in use.

Having thus described my invention, I claim as new and desire to secure by Letters Patent—

1. A car-mover consisting of cog-wheels, having teeth running in opposite direction, and grooved side disks, secured permanently to axle, in combination with a detachable yoke-frame, having lever-sockets and actuating-pawl, substantially in the manner and for the purpose set forth.

2. The yoke-frame fitted to the side disks of the cog-wheels, and carrying on the lateral brace-bolts a rigid lever with end sockets, and a swinging pawl pivoted to one cross-bolt, substantially in the manner and for the purpose specified.

3. The combination, with a car axle or shaft, of rigid cog-wheels, having teeth arranged at opposite direction, and of circumferentially-grooved side disks or collar attached to the fixed cog-wheels, substantially as described.

DANIEL PIERCE.

Witnesses:
O. H. AUSTIN,
C. S. GIBB.